(12) United States Patent
Degler et al.

(10) Patent No.: US 8,047,344 B2
(45) Date of Patent: Nov. 1, 2011

(54) TORSIONAL VIBRATION DAMPER AND HYDRODYNAMIC TORQUE CONVERTER DEVICE FOR AN AUTOMOTIVE DRIVE TRAIN

(75) Inventors: Mario Degler, Baden-Baden (DE); Stephan Maienschein, Baden-Baden (DE); Jan Loxtermann, Baden-Baden (DE); Thorsten Krause, Buehl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 401 days.

(21) Appl. No.: 12/084,831

(22) PCT Filed: Oct. 21, 2006

(86) PCT No.: PCT/DE2006/001874
§ 371 (c)(1),
(2), (4) Date: May 9, 2008

(87) PCT Pub. No.: WO2007/054062
PCT Pub. Date: May 18, 2007

(65) Prior Publication Data
US 2009/0152066 A1    Jun. 18, 2009

(30) Foreign Application Priority Data
Nov. 10, 2005   (DE) .................. 10 2005 053 598

(51) Int. Cl.
*F16H 45/02*    (2006.01)
*F16D 3/12*     (2006.01)
*F16D 3/66*     (2006.01)

(52) U.S. Cl. .................. 192/3.29; 192/55.61; 192/212; 464/68.1

(58) Field of Classification Search .................. None
See application file for complete search history.

(56) References Cited

U.S. PATENT DOCUMENTS

| | | | |
|---|---|---|---|
| 5,377,796 A * | 1/1995 | Friedmann et al. | 192/3.29 |
| 6,016,894 A * | 1/2000 | Kundermann | 192/3.3 |
| 6,244,401 B1 * | 6/2001 | Maienschein et al. | 192/3.3 |
| 7,073,646 B2 * | 7/2006 | Sasse et al. | 192/3.29 |
| 2005/0070362 A1 * | 3/2005 | Mende et al. | 464/68 |

FOREIGN PATENT DOCUMENTS

| | | |
|---|---|---|
| DE | 19920542 A1 | 11/1999 |
| DE | 10209383 A1 | 9/2002 |
| DE | 10241879 A1 | 4/2003 |
| DE | 102004006879 A1 | 8/2004 |
| DE | 10358901 A1 | 2/2005 |

* cited by examiner

*Primary Examiner* — David D Le
*Assistant Examiner* — Jacob S Scott
(74) *Attorney, Agent, or Firm* — Simpson & Simpson, PLLC (57) ABSTRACT

A torsional vibration damper (10) and a hydrodynamic torque converter device (1). The converter device has a converter torus (18) which is configured by an impeller (12), a turbine wheel (14) and a stator (16), and a converter lockup clutch (20). The torsional vibration damper (10) has at least one first energy accumulating device (28) with one ere or more first energy accumulators (68) (e.g. coil spring or bow spring), at least one first wall (92) radially supporting the at least one first energy accumulator (68), where a rolling body device (98) (e.g. a rolling gear) is interposed between the at least one first wall (92) and the at least first energy accumulator (68) (e.g. coil spring or bow spring).

16 Claims, 5 Drawing Sheets

TORSIONAL VIBRATION DAMPER AND HYDRODYNAMIC TORQUE CONVERTER DEVICE FOR AN AUTOMOTIVE DRIVE TRAIN

CROSS-REFERENCE TO RELATED APPLICATIONS

This application is the National Stage of PCT International Application No. PCT/DE2006/001874, filed Oct. 21, 2006, which application published in German and is hereby incorporated by reference in its entirety, which application claims priority from German Patent Application No. DE 10 2005 053 598.4, filed Nov. 10, 2005 which is incorporated by reference in its entirety.

FIELD OF THE INVENTION

The invention relates to a hydrodynamic torque converter device for a motor vehicle drive train, comprising a torsion vibration damper.

BACKGROUND OF THE INVENTION

Figure 2:
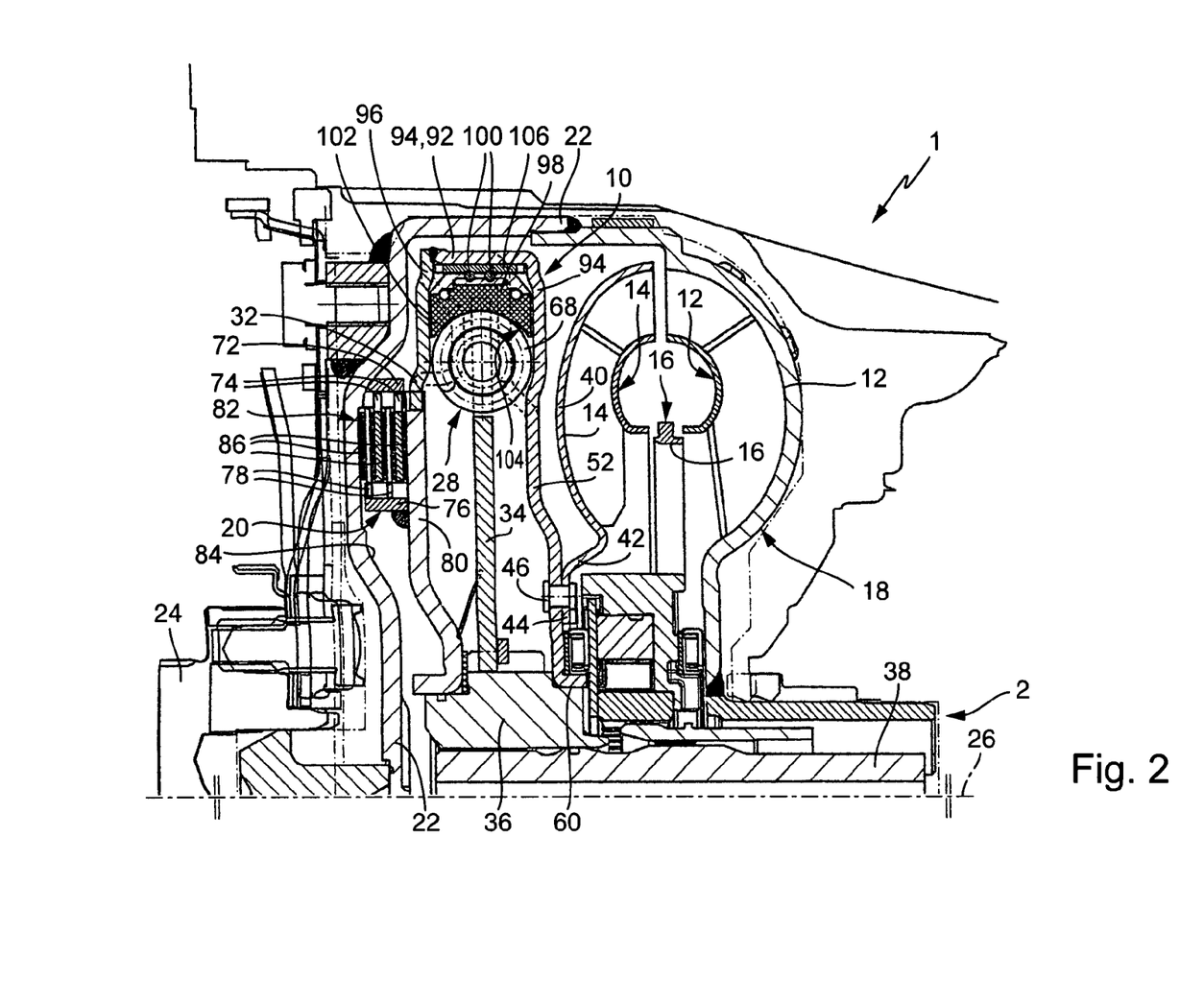
FIG. 2 is a partial, cross-sectional view of a second embodiment of the hydrodynamic torque converter device comprising a second exemplary torsion vibration damper.

A hydrodynamic torque converter device comprising a torsion vibration damper and a converter torus formed by a pump shell, a turbine shell and a stator shell, and which comprises a converter lockup clutch, is shown in FIG. 2 of German Patent No. DE 199 20 542 A1. According to this known embodiment, the torsion vibration damper comprises a first energy accumulator means, which comprises several first energy accumulators respectively configured as arc springs, and a second energy accumulator means, which is disposed, with reference to the radial direction of the rotation axis of the torsion vibration damper, radially within the first energy accumulator means, and which comprises several second energy accumulators. The first energy accumulators are thus inserted into wear protection shells.

German Patent No. DE 102 09 838 A1 discloses a rotation- or torsion vibration damper with exactly one energy accumulator means, which comprises at least one first energy accumulator formed by a coil spring. With reference to the radial direction of the rotation axis of the torsion vibration damper, a wall thus extends on the radial exterior of the at least one first energy accumulator, at which the at least one first energy accumulator can be radially supported. In order to avoid particularly high friction between the at least one first energy accumulator, slider shoes are used, which are supported towards the radial exterior at the wall, and which are slid onto at least one radially exterior portion of at least one winding of the at least one energy accumulator.

BRIEF SUMMARY OF THE INVENTION

Broadly, the present invention is a hydrodynamic torque converter device for a motor vehicle drive train, wherein the torque converter device comprises a torsion vibration damper, a converter torus formed a pump shell, a turbine shell and a stator shell and comprises a converter lockup clutch. The torsion vibration damper comprises a first energy accumulator means. The first energy accumulator means comprises one or more first energy accumulators, or it is formed by the energy accumulator(s). One or more first walls is provided for the radial support of the at least one first energy accumulator. For low friction support of the at least one first energy accumulator at the at least one first wall, at least one roller element means is provided. The roller element means comprises at least one, but preferably several roller elements. The roller elements are balls, in a preferred embodiment. The roller element means is disposed between the at least one first energy accumulator and the at least one first wall.

It should be appreciated that a device designated herein as "converter torus" is partially designated as "hydrodynamic torque converter". The term "hydrodynamic torque converter" is, however, partially used in prior publications also for devices comprising a torsion vibration damper, a converter lockup clutch and a means formed by a pump shell, a turbine shell and a stator shell, or a converter torus, according to the language of the present disclosure. Hereinafter, the terms "hydrodynamic torque converter device" and "converter torus" are used in the present disclosure.

Preferably, several roller element means can be provided, wherein the roller elements preferably are balls or rollers. Subsequently, a roller element means is described for simplification purposes, wherein, in preferred embodiments in which several roller elements are provided, these can respectively be configured as it is described for the roller element means. The roller element can be designated as roller shoe, in particular.

The roller element means, in a preferred embodiment, comprises a roller element carrier and several roller elements, which are received or supported by the roller element carrier.

The first wall is non-rotatably coupled, in a preferred embodiment, to an output component of the first energy accumulator means, or it is formed at or by the output component. It can also be provided that the first wall is non-rotatably coupled to an input component of the first energy accumulator means, or formed at or by the input component.

It is provided, in particular, that the torsion vibration damper is rotatable about a rotation axis. Non-rotatable connections or couplings of components, which are mentioned in the context of the present disclosure, are non-rotatably connected or coupled with reference to a rotation about the axis of rotation.

In a preferred embodiment, the first wall is substantially closed circumferentially with reference to the circumferential direction of the rotation axis of the torsion vibration damper. The first wall can, e.g., be cylindrical or annular. The first wall forms on its surface, which is disposed radially inward with reference to the radial direction of the rotation axis of the torsion vibration damper, a support portion for the roller element means. Between the first wall and the roller element means or between the roller elements of the roller element means, a dish can be provided, through which the roller elements of the roller element means are supported at the first wall.

In a preferred embodiment, the torsion vibration damper comprises a second energy accumulator means in addition to the first energy accumulator means, wherein the second energy accumulator means comprises one or several second energy accumulators. Thus, it can be provided that the converter lockup clutch, the first energy accumulator means, and the second energy accumulator means are connected in series. This can also be provided so that, within the serial connection, the first energy accumulator means is disposed between the converter lockup clutch and the second energy accumulator means. In a preferred embodiment, an intermediary component is provided, which is also connected in series with the first and the second energy accumulator means within the series connection between the first and the second energy accumulator means, wherein the intermediary component is, e.g., an input component of the second energy accumulator means and/or an output component of the first energy accumulator means, or non-rotatably coupled to the input component and the output component, wherein one or the outer turbine dish of the turbine or of the turbine shell is non-rotatably coupled to the intermediary component.

The invention may further include a torsion vibration damper particularly configured for a motor vehicle drive train. The torsion vibration damper can be improved, as it is described in the context with the torsion vibration damper of the hydrodynamic torque converter device according to the invention.

It is the object of the invention to provide a hydrodynamic torque converter device comprising a torsion vibration damper for a motor vehicle drive train, and a torsion vibration damper, which have good operating characteristics.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIGS. 1-5 show different exemplary embodiments of hydrodynamic torque converter device 1 of the present invention, each comprising exemplary torsion vibration dampers 10. Hydrodynamic torque converter devices 1 shown therein can each be integrated into motor vehicle drive train 2, or can be components of motor vehicle drive train 2.

As shown in FIGS. 1-5, hydrodynamic torque converter device 1 further comprises converter torus 18 formed by pump shell 12, turbine shell 14 and stator shell 16 and also comprises converter lockup clutch 20.

Torsion vibration damper 10, converter torus 18 and converter lockup clutch 20 are received in converter housing 22. Converter housing 22 is substantially non-rotatably connected to drive shaft 24, which is, e.g., the crank shaft or engine output shaft of a combustion engine. Torsion vibration damper 10 is rotatable about rotation axis 26.

Figure 3:
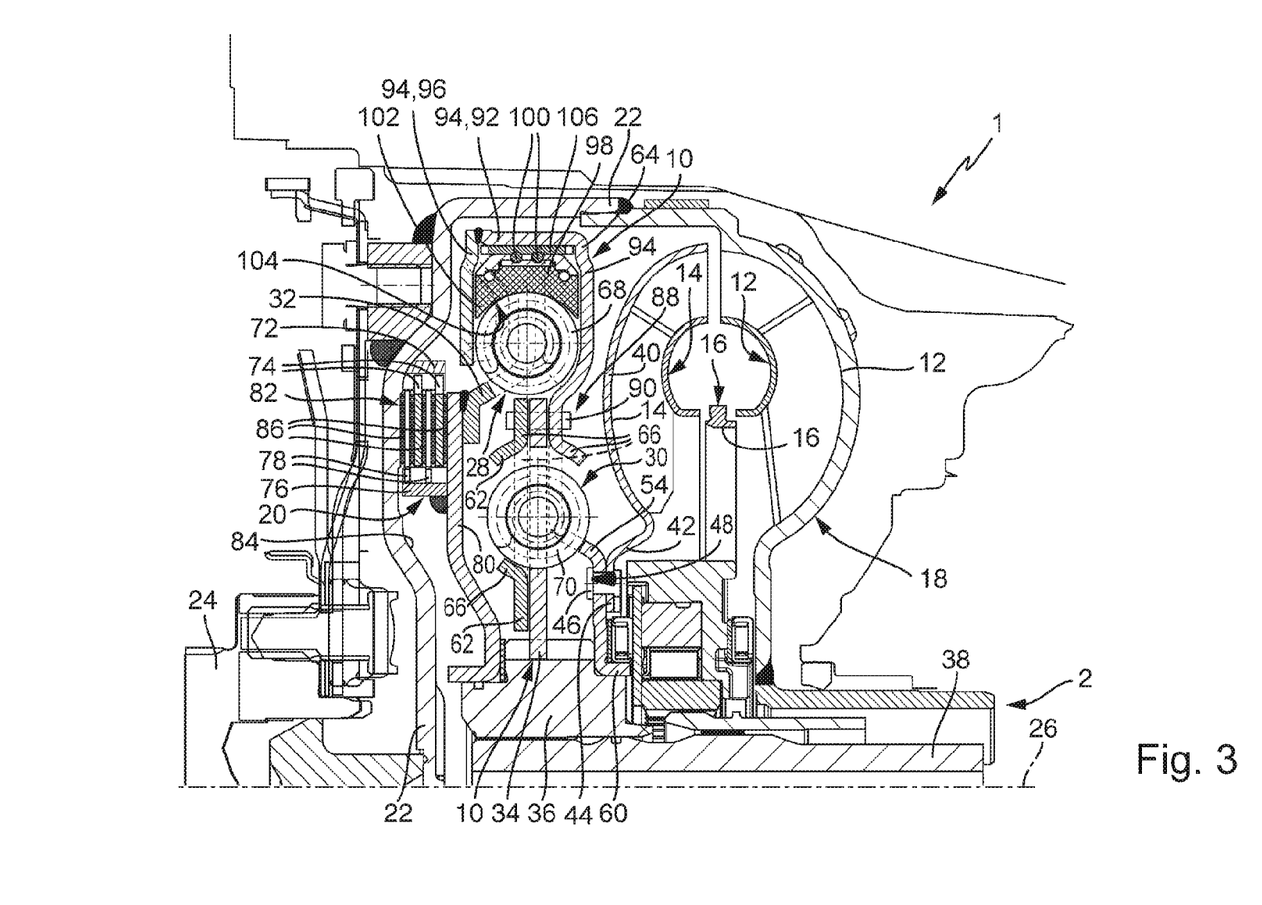
FIG. 3 is a partial, cross-sectional view of a third embodiment of the hydrodynamic torque converter device comprising a third exemplary torsion vibration damper.
Figure 4:
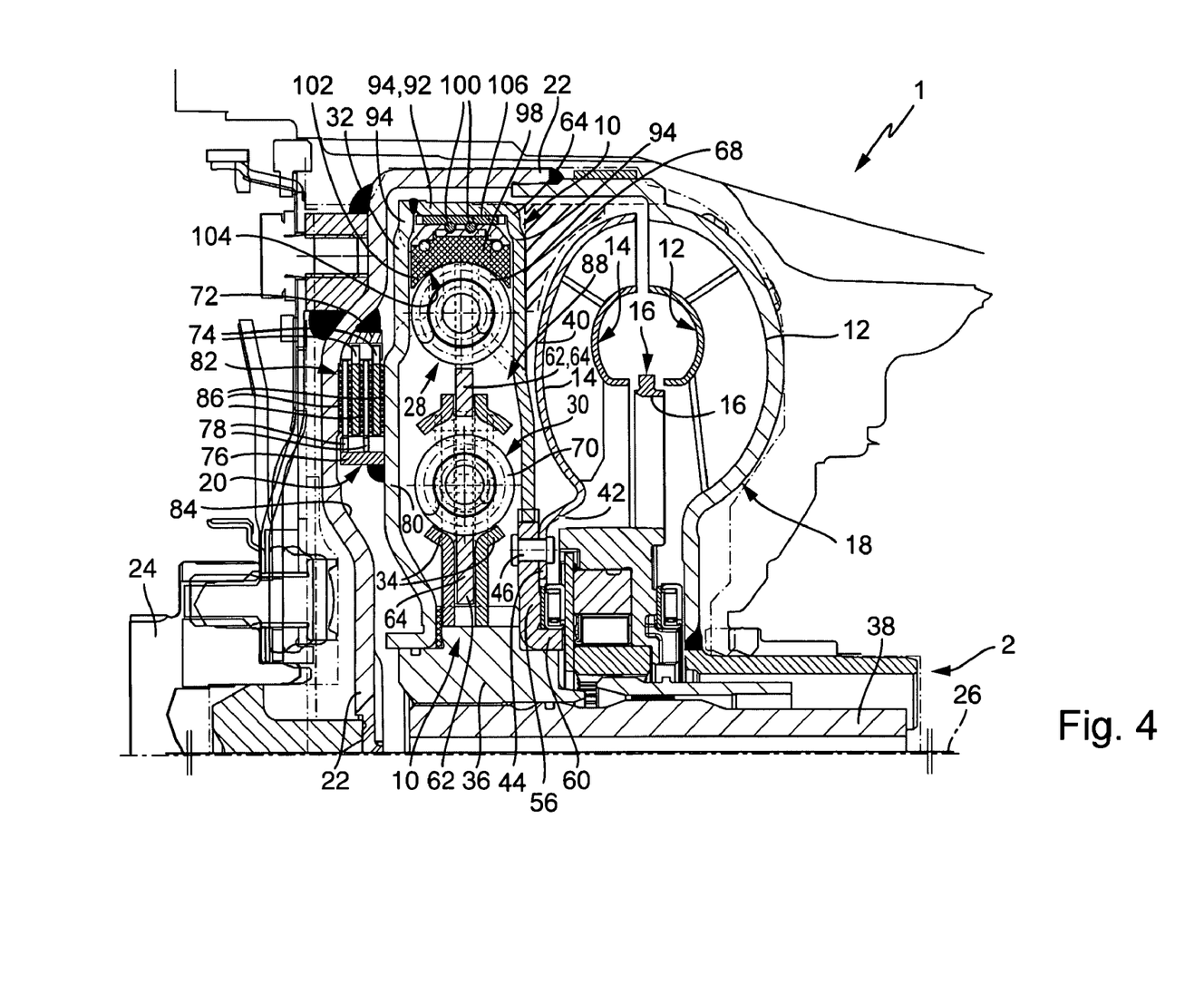
FIG. 4 is a partial, cross-sectional view of a fourth embodiment of the hydrodynamic torque converter device comprising a fourth exemplary torsion vibration damper; and, FIG. 5 is a partial, cross-sectional view of a fifth embodiment of the hydrodynamic torque converter device comprising a fifth exemplary torsion vibration damper.

Torsion vibration damper 10 comprises first energy accumulator means 28. In the embodiments shown in FIGS. 1 and 2, torsion vibration damper 10 only comprises one energy accumulator means 28, thus first energy accumulator means 28. In the embodiments shown in FIGS. 3 and 4, torsion vibration damper 10 comprises second energy accumulator means 30 in addition to first energy accumulator means 28. As shown in FIGS. 3 and 4, first energy accumulator means 28 is disposed therein with reference to the radial direction of rotation axis 26 radially outside of second energy accumulator means 30. Energy accumulator means 28 and 30 can be alternatively disposed, e.g., at the same radial elevation or substantially at the same elevation, which is not shown. Second energy accumulator means 30 is connected in series with first energy accumulator means 28.

As illustrated in FIGS. 1-5, torque converter device 1 comprises input component 32 for torsion vibration damper 10 and output component 34 for torsion vibration damper 10. In the embodiments shown in FIGS. 1-5, input component 32 for torsion vibration damper 10 forms input component 32 for first energy accumulator means 28. In the embodiments shown in FIGS. 1 and 2, output component 34 for torsion vibration damper 10 forms output component 34 for first energy accumulator means 28, and in the embodiments shown in FIGS. 3-5, output component 34 for torsion vibration damper 10 forms output component 34 for second energy accumulator means 30. In the embodiments shown in FIGS. 4 and 5, two respective output components 34 for second energy accumulator means 30, or two output components 34 for torsion vibration damper 10, are provided, which are non-rotatably coupled amongst one another and connected in parallel with each other. In the embodiments shown in FIGS. 1-5, the torsion vibration damper can transfer a torque from its input component 32 to its output component(s) 34.

In the embodiments shown in FIGS. 1-5, output component(s) 34 of torsion vibration damper 10 engage(s) hub 36, forming a non-rotatable connection, wherein hub 36 is, in turn, connected to output shaft 38 of torque converter device 1, which, in turn, is a transmission input shaft of a motor vehicle transmission. It can alternatively be provided that hub 36, non-rotatably coupled to shaft 38, is integrally formed with output component(s) 34 or connected by welding or the like.

Turbine shell 14 comprises outer turbine dish 40. Outer turbine dish 40 comprises extension 42. Extension 42 comprises straight or annular portion 44. Straight or annular portion 44 of extension 42 can, e.g., be configured so that it is substantially straight in radial direction of rotation axis 26 of torsion vibration damper 10, and that it is disposed as an annular section in a plane perpendicular to rotation axis 26, or that it defines the plane. In the portion of extension 42, or of straight or annular section 44 of extension 42, a non-rotatable connection is provided by a connection means, as illustrated in FIGS. 1-5 as rivet or bolt 46 and/or weld 48, to one or at least one subsequent or adjoining component in the torque flow (see, driver component 50 in FIG. 1, driver component 52 in FIG. 2, driver component 54 in FIG. 3, driver component 56 in FIG. 4, and driver component 58 in FIG. 5). Thus, it is facilitated that the turbine or turbine shell 14 or outer turbine dish 40 can be easily non-rotatably connected to subsequent components in the torque flow.

Outer turbine dish 40 is radially supported at hub 36, in particular, by sleeve-shaped support section 60. Support section 60 is non-rotatably connected to outer turbine dish 40. Support section 60 or outer turbine dish 40 is rotatable relative to hub 36. It can be provided that, between hub 36 and support section 60, a straight bearing or a straight bearing bushing or a roller bearing or similar are provided for radial support. Furthermore, respective bearings can be provided for axial support.

Figure 5:
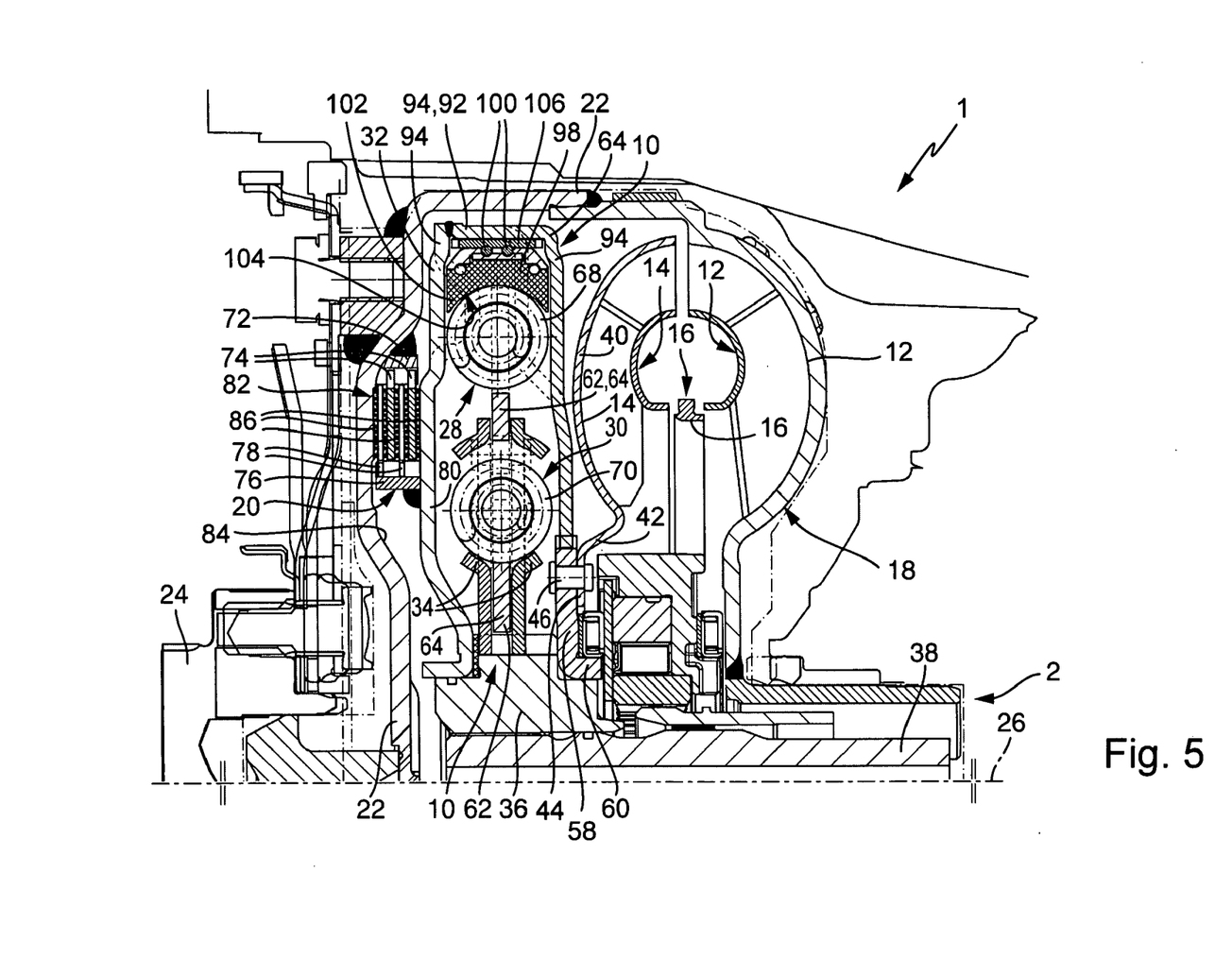

In the embodiments shown in FIGS. 3-5, in which torque converter device 1 comprises two energy accumulator means 28 and 30, intermediary component 62 is provided between energy accumulator means 28 and 30, wherein intermediary component 62 is connected in series with energy accumulator means 28 and 30. Furthermore, output component 64 of first energy accumulator means 28 and input component 66 of second energy accumulator means 30 are provided in the embodiments shown in FIGS. 3-5. Intermediary component 62 can, e.g., be output component 64 of first energy accumulator means 28, as shown in FIGS. 4 and 5, or it can be input component 66 of second energy accumulator means 30, as shown in FIGS. 3-5, or it can be a component, which is different from output component 64 and input component 66. It can also be provided that output component 64 of first energy accumulator means 28 and input component 66 of second energy accumulator means 30 are formed by the same component, which then is intermediary component 62, as shown in FIG. 3. Output component 64 of first energy accumulator means 28 and input component 66 of second energy accumulator means 30, however, can also be formed by different components, as shown in FIGS. 4 and 5. In the embodiments shown in FIGS. 3-5, e.g., when converter lockup clutch 20 is closed, a torque can thus be transferred from input component 32 of first energy accumulator means 28 through energy accumulator means 28 to intermediary component 62 and from intermediary component 62, through second energy accumulator means 30 to output component 34 of second energy accumulator means 30.

With respect to the embodiments shown in FIGS. 3-5, first energy accumulator means 28 and/or second energy accumulator means 30 are spring means, in particular.

In the embodiments shown in FIGS. 1-5, first energy accumulator means 28 comprises a plurality of first energy accumulators 68 arranged in a circumferential direction extending about rotation axis 26 and disposed at a distance from one another, which are coil springs or arc springs, in particular. It can be provided that several first energy accumulators 68 are configured identically. It can also be provided that differently configured first energy accumulators 68 are provided. It can furthermore be provided that all first energy accumulators 68, with reference to the circumferential direction of rotation axis 26, are offset from one another. However, it can also be provided that several first energy accumulators 68 are spaced at a distance from one another in circumferential direction and receive at least one additional first energy accumulator 68 in their interior.

In the embodiments shown in FIGS. 3-5, second energy accumulator means 30 comprises a plurality of second energy accumulators 70, respectively provided as a coil spring, straight spring or straight compression spring. Thus, in a preferred embodiment, all or several second energy accumulators 70 are disposed with reference to the circumferential direction of rotation axis 26 offset at a distance from one another. It can be provided that second energy accumulators 70 are configured respectively identically. Different second energy accumulators 70, however, can also be configured differently. It can be provided that, with reference to the circumferential direction of rotation axis 26, all second energy accumulators 70 are offset from one another. However, it can also be provided, e.g., that several second energy accumulators 70 are offset in circumferential direction from one another and receive at least one additional second energy accumulator 70 in their interior.

Converter lockup clutch 20 is configured as a respective multi-disk clutch in the embodiments shown in FIGS. 1-5, and comprises first disk carrier 72, by which first disks 74 are non-rotatably received, and comprises second disk carrier 76, by which second disks 78 are non-rotatably received. When multi-disk clutch 20 is open, first disk carrier 72 is movable relative to second disk carrier 76, so that first disk carrier 72 can be rotated relative to second disk carrier 76. Second disk carrier 76 is disposed radially within first disk carrier 72 with reference to the radial direction of axis 26, which, however, can also be arranged the other way around. First disk carrier 72 is attached to converter housing 22. For actuation, multi-disk clutch 20 comprises piston 80, which is disposed axially movable, and which can be loaded, e.g., hydraulically for actuating multi-disk clutch 20. Piston 80 is non-rotatably attached or connected to second disk carrier 76, which can be effectuated, e.g., by a welded connection. First disk 74 and second disk 78 alternate in longitudinal direction of the rotation axis. When loading disk packet 82, formed by first disk 74 and by second disks 78 by means of piston 80, disk packet 82 is supported on the side of disk packet 82 opposite to piston 80 at a section of inner side 84 of converter housing 22. Between adjacent disks 74 and 78, and at both ends of disk packet 82, friction liners 86 are provided, which are, e.g., supported at disks 74 and/or 78. Friction liners 86, which are provided at the end sides of disk packet 82, can be held on the one side and/or the other side, or at the inside 84 of converter housing 22, or at piston 80.

Piston 80 is integrally connected to input component 32 of first energy accumulator means 28, or non-rotatably connected to input component 32.

Torsion vibration damper 10 of torque converter device 1, in the embodiment shown in FIG. 2, comprises only one energy accumulator means, namely, first energy accumulator means 28, wherein first energy accumulators 68 of first energy accumulator means 28 are arc springs. This is also the case in the embodiment shown in FIG. 1. However, in this embodiment, as opposed to that which is shown in FIG. 2, first energy accumulator means 28, with reference to the radial direction of rotation axis 26, is disposed substantially further on the radial inside. With reference to the radial distance between axis 26 and the radially exterior section of the enveloping surface of converter housing 22, the axes or the center force effect lines of first energy accumulators or arc springs 68 are disposed in the two inner thirds of the distance, while in the embodiment shown in FIG. 2, the center axes or force effect lines are substantially positioned in the radially exterior third. The embodiment shown in FIG. 1 can also be designated as "small radius damper", which comprises arc springs and which is configured in a turbine torsion damper configuration. The configuration shown in FIG. 2 can also be designated as turbine torsion damper (TTD) comprising arc springs. In the embodiments shown in FIGS. 1 and 2, outer turbine shell 40 is non-rotatably connected to input component 32 of first energy accumulator means 28.

In the embodiments shown in FIGS. 4 and 5, in which torsion vibration damper 10 of torque converter device 1 comprises first energy accumulator means 28 and second energy accumulator means 30, outer turbine dish 40 is non-rotatably connected to input component 32 of first energy accumulator means 28.

In the embodiment shown in FIG. 3, as opposed to those which are shown in FIGS. 4 and 5, outer turbine dish 40 is non-rotatably connected to intermediary component 62 or to output component 64 of first energy accumulator means 28, or to input component 66 of second energy accumulator means 30.

Input component 32 of first energy accumulator means 28 forms respective support portions in the embodiments shown in FIGS. 1-5, by means of which first energy accumulators 68 can be supported or loaded at their first ends. In the embodiments shown in FIGS. 1 and 2, output component 34 of first energy accumulator means 28 forms support portions, by means of which respective first energy accumulators 68 can be supported or loaded at their second ends, which are the ends respectively facing away from the respective first ends. In the embodiments shown in FIGS. 3-5, output component 64 of first energy accumulator means 28 forms support portions, by means of which respective first energy accumulators 68 can be supported or loaded at their second ends, which are the ends facing away from the respective first ends. Furthermore, in the embodiments shown in FIGS. 3-5, the respective input component 66 of second energy accumulator means 30 forms support portions, by means of which second energy accumulators 70 can be supported or loaded at their first ends. Furthermore, in the embodiments shown in FIGS. 3-5, the respective output component 34 of second energy accumulator means 30 forms support portions, by means of which second accumulators 70 can be supported or loaded at their second ends, which are the ends respectively facing away from the first end.

Figure 1:
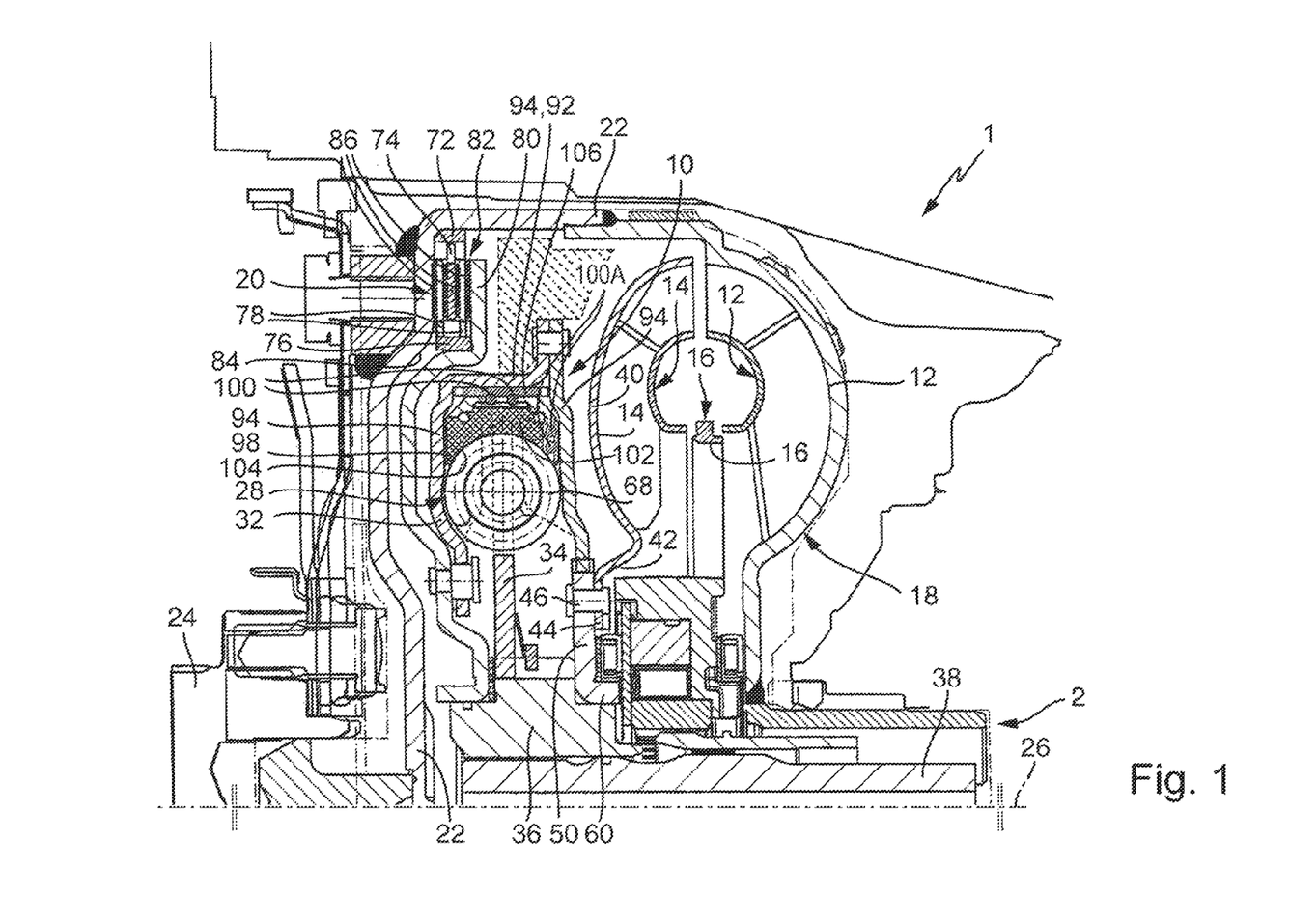
FIG. 1 is a partial, cross-sectional view of a first embodiment of the hydrodynamic torque converter device of the present invention, comprising a first exemplary torsion vibration damper.

In the embodiments shown in FIGS. 1 and 2, piston 80 or input component 32 of first energy accumulator means 28 and/or output component 34 of first energy accumulator means 28 is a flange or plate, respectively. In the embodiments shown in FIGS. 3-5, piston 80 or input component 32 of first energy accumulator means 28, or intermediary component 62, or intermediary component 54 or driver component 54, 56, or 58, or output component 34 of second energy accumulator means 30, is a flange or plate, respectively.

In the embodiment shown in FIG. 3, output component 64 of first energy accumulator means 28 is formed by driver component 54. Driver component 54 is disposed such that outer turbine dish 40 or its extension 42 non-rotatably connects to intermediary component 62, so that it is facilitated that a torque can be transferred from outer turbine dish 40 through driver component 54 to intermediary component 62. Additionally, in this particular embodiment, it can also be provided, that extension 42 also forms intermediary component 62 and/or driver component 54, or performs their functions. It can also be provided that driver component 54 forms intermediary component 62, which is connected in series in the torque flow between energy accumulator means 28 and 30. It can also be provided in this embodiment, which, however, is not shown in the figure, that the mass moment inertia and/or the plate thickness of driver component 54 is greater than the mass moment of inertia or the plate thickness of piston 80, or of input component 32 of first energy accumulator means 28, or of the unit made from components 32 and 80.

In the embodiments shown in FIGS. 3-5, input component 32 of first energy accumulator means 28 can be rotated relative to output component 64 of first energy accumulator means 28, and thus, in particular, about the axis 26, wherein the relative rotational angle between input component 62 and output component 64 is limited to a maximum first relative rotation angle. Furthermore, input component 66 of second energy accumulator means 30 can be rotated relative to output component 34 of second energy accumulator means 30, and thus, in particular, about rotation axis 26, wherein the relative rotation angle between input component 66 and output component 34 is limited to a maximum second rotation angle.

Torsion vibration damper 10 is respectively configured according to the embodiments shown in FIGS. 3-5, so that input component 32 of first energy accumulator means 28 is rotated relative to output component 64 of first energy accumulator means 28 according to the maximum relative rotation angle, when a torque is supplied to first energy accumulator means 28, which is greater than or equal to a first threshold torque, and so that input component 66 of second energy accumulator means 30 is rotated relative to output component 34 of second energy accumulator means 30 according to the maximum second relative rotation angle, when a torque is applied to second energy accumulator means 30, which is greater than or equal to a second threshold torque. Thus, it is provided that the first threshold torque is less than the second threshold torque. It can, e.g., be provided that the second threshold torque is greater than 1.5 times, preferably greater than 2 times, preferably greater than 3 times, and preferably greater than 4 times the first threshold torque. The second threshold torque can be greater or equal or less than the maximum engine torque of a combustion engine of the drive train, in which the torque converter device is installed.

In the embodiment shown in FIG. 3, and this can be accordingly provided in the embodiments shown in FIGS. 4 and 5, it is provided that first, or at least several, first energy accumulators 68 of first energy accumulator means 28 go into blockage, when a torque is supplied to first energy accumulator means 28, which corresponds to the first threshold torque, and that second relative rotation angle limiter means 88 is provided, by which the second relative rotation angle of input component 66 of second energy accumulator means 30 is limited relative to output component 34 of second energy accumulator means 30 to the maximum second relative rotation angle. Thus, it is provided that the second relative rotation angle is limited by second relative rotation angle limiter means 88, so that it is avoided that second energy accumulators 70, which are springs, go into blockage under a correspondingly high torque loading.

Second relative rotation angle limiter device 88 is, as illustrated in FIG. 3, e.g., configured so that output component 64 or driver component 54 and intermediary component 62 are non-rotatably connected through bolt 90, wherein bolt 90 extends through a slotted hole, or into a groove, which is provided in output component 34 of second energy accumulator means 30. When a torque corresponding to the second threshold torque is applied to second energy accumulator means 30, second relative rotation angle limiter means 88 reaches a stop position, by which it is avoided, that the second relative rotation angle is increased further. The relative rotation angle, which is given when reaching the stop position between input component 66 and second accumulator means 30 and output component 34 of second energy accumulator means 30, is the maximum second relative rotation angle. While not shown in the figures, it is appreciated that, in the embodiments shown in FIGS. 4 and 5, second relative rotation angle limiter means 88 can be provided, there, e.g., two output components 34 of second energy accumulator means 30 are non-rotatably connected by a bolt and the bolt extends into a groove or into a slotted hole, which is provided in input component 66 of second energy accumulator means 30.

As an alternative to the blockage loading of first energy accumulators, also a first relative rotation angle limiter device, which is not shown, can be provided in the configurations shown in FIGS. 3-5 for limiting the relative rotation to the maximum first relative rotation angle, since first energy accumulators 68 of these particular embodiments are arc springs and second energy accumulators 70 are straight springs, and in case of arc springs, the risk of damages in case of blockage loading is less than with straight springs, it is provided in the embodiments shown in FIGS. 3-5, this can be provided accordingly, since this reduces the number of components or the manufacturing cost, that first energy accumulators 68 go into blockage in order to provide a limitation to the maximum first relative rotation angle, and second relative rotation angle limiter means 88 is provided for limiting the rotation to the maximum second relative rotation angle. This way a good setting can be reached for partial load operation.

In the exemplary embodiments of hydrodynamic torque converter device 1 according to the invention, or of torsion vibration damper 10 according to FIGS. 1-5, first wall 92 for the radial support of at least one of first energy accumulator means 68 is provided. First wall 92 is disposed with reference to the radial direction of rotation axis 26 radially outside of first energy accumulator(s) 68. First wall 92 is closed or substantially closed in circumferential direction with reference to the circumferential direction of rotation axis 26 of torsion vibration damper 10.

First wall 92 can, e.g., be a component of first housing 94, in which first energy accumulators 68 are received. In the embodiments shown in FIGS. 1, 2, 4, and 5, first housing 94 forming first wall 92 is formed substantially by input component 32 of first energy accumulator means 28 or by piston 80 and driver component 50, 52, 56, or 58. In the embodiment shown in FIG. 3, first housing 94 forming first wall 92 is formed substantially by input component 32 of first energy accumulator means 28, by driver component 54, or by means of component 32 or 54, and by cover 96 integrally formed therewith or mounted thereon.

First wall 94 is formed, in the embodiment shown in FIG. 1, by input component 32 of first energy accumulator means 28, or by wall section of input component 32. In the embodiments shown in FIGS. 2-5, first wall 92 is formed by the respective driver component 52, 54, 56, or 58, or by a wall section of the respective driver component 52, 54, 56, or 58.

In the embodiments shown in FIGS. 1-5, at least one roller element means 98 or a roller shoe is provided for low friction support of at least one first energy accumulator 68 at first wall 92. A common roller element means 98 can be provided for low friction support of all first energy accumulators 68. It can also be provided that several roller element means 98 are provided for the low friction support of first energy accumulator(s) 68. It can be provided, in particular, that the number of roller element means 98 corresponds to the number of first energy accumulators 68. It can furthermore be provided that the number of roller element means 98 is greater than the number of first energy accumulators 68. It can also be provided that the number of roller element means 98 is less than the number of first energy accumulators 68.

For the sake of simplicity, roller element means 98 is subsequently referred to, wherein as discussed, several roller element means 98 can be provided, which are then, e.g., respectively configured or disposed, as subsequently described with reference to roller element means 98. Several roller element means 98 can be provided distributed circumferentially with reference to the circumferential direction of rotation axis 26.

Roller element means 98 comprises several roller elements 100, which can be balls and which are balls in the present disclosure. Roller element means 98 is disposed between at least one first energy accumulator 68 and first wall 92, and thus with reference to the radial direction of rotation axis 26, in particular, radially in between first energy accumulator(s) 68 and first wall 92.

Roller element means 98 comprises roller element carrier 102. Roller element carrier 102 receives or supports roller elements 100. It is appreciated that the support may be provided when centrifugal forces act upon first energy accumulators 68, and thus at high speeds of torsion vibration damper 10.

Roller element carrier 102 comprises portion 104, which may be dish-shaped, and which is, with reference to the circumferential direction of rotation axis 26, curved in circumferential direction in an arcuate shape, and curved transversal to the circumferential direction in an arcuate manner, wherein portion 104 can be provided as a curved groove. Portion 104 is disposed on the radially inner side of roller element carrier 102 with reference to the radial direction of rotation axis 26. It can be provided that the circumferential curvature of portion 104, with reference to the circumferential direction of rotation axis 26, substantially corresponds to a curvature in this direction of first energy accumulators 68, configured as arc springs, and/or that the curvature of portion 104, existing transversal to the circumferential direction, substantially corresponds to the outer curvature of the windings of first energy accumulators 68 configured as arc springs. It can further be provided that first energy accumulators 68 are supported, or can be supported at portion 104, in particular, under the influence of centrifugal forces. However, it can also be provided that roller element carrier 102 provides mechanical support means, which are not shown in the figures, which engage one or several energy accumulators 68. For example, roller element means 98 or roller element carrier 102 can be slipped onto first energy accumulator 68, and thus in the portion of a winding section of first energy accumulator 68 disposed in the radially outer portion with reference to the radial direction of rotation axis 26.

This can, e.g., be provided, as described in German Patent No. DE 199 20 542 A1, with reference to the slider shoes and the energy accumulators or force accumulators described therein, so that the respective disclosure of DE 199 20 542 A1 is referred to incorporated by reference into the present disclosure as a preferred improvement in its entirety.

In the embodiments shown in FIGS. 1-5, roller elements 100 are disposed on the radial outside of roller element carrier 102 with reference to the radial direction of rotation axis 26. This is performed therein, so that roller elements 100 are disposed between roller element carrier 102 and first wall 92, or first wall 94, so that they can support roller element carrier 102 at first wall 92 and at first housing 94.

In the embodiments shown in FIGS. 1-5, roller elements 100 of at least one roller element means 98 are configured so that they form several rows, which are spaced apart from one another in axial direction, when viewed in axial direction of rotation axis 26 of torsion vibration damper 10. The rows are configured respectively by several balls or roller elements 100, which are distributed in circumferential direction with reference to rotation axis 26.

It can be provided that first wall 92, first housing 94, or dish 106 inserted herein, in particular, non-rotatably relative to first wall 92 or relative to first housing 94, which is, e.g., a hardened dish, and/or roller element carrier 102 forms, e.g., groove-shaped running surfaces for roller elements 100, configured as balls.

As shown in FIG. 1, first energy accumulators 68 can also be supported with reference to the axial direction of rotation axis 26 in axial direction at first housing 94, and thus in both orientations of the axial direction. Thus, it can be provided that, in the axial direction between walls of housing 94 and roller element carrier 102, roller elements 100A, in particular, balls 100A, are provided.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

DESIGNATIONS 1 hydrodynamic torque converter device
2 motor vehicle drive train
10 torsion vibration damper
12 pump or pump shell
14 turbine or turbine shell
16 stator shell
18 converter torus
20 converter lockup clutch
22 converter housing
24 drive shaft, like e.g. engine output shaft of a combustion engine
26 rotation axis of 10
28 first energy accumulator means
30 second energy accumulator means
32 input component of 28
34 output component of 30
36 hub
38 output component, transmission input shaft
40 outer turbine dish
42 extension of 30 at 26
44 straight section of 42 or annular disk shaped section of 42
46 connection means or bolt or rivet connection between 42 and 50 or 52 or 54 or 56 or 58
48 connection means or welded connection between 42 and 54
50 driver component (FIG. 1)
52 driver component (FIG. 2)
54 driver component (FIG. 3)
56 driver component (FIG. 4)
58 driver component (FIG. 5)
60 support section
62 intermediary component of 10
64 output component of 28
66 input component of 30
68 first energy accumulator
70 second energy accumulator
72 first disk carrier of 14
74 first disk of 14
76 second disk carrier of 14
78 second disk of 14
80 piston for actuating 14
82 disk packet of 14
84 inside of 22
86 friction liner of 14
88 second relative rotation angle limiter means of 30
90 connection means or bolt or rivet connection between 54 and 62
92 first wall for radial support of 68
94 first housing for
96 cover of 94 in FIG. 3
98 roller element means or roller shoe
100 roller element of 98
102 roller element carrier of 98
104 curved portion of 102
106 dish

What is claimed is:

1. A hydrodynamic torque converter device for a motor vehicle drive train, the hydrodynamic torque converter device comprising:
   a torsion vibration damper having a first energy accumulator means, the first energy accumulator means including at least one first energy accumulator;
   a converter torus having a pump shell, a turbine shell, and a stator shell;
   a converter lockup clutch;
   at least one first wall arranged to radially support the at least one first energy accumulator;
   at least one second wall arranged to axially support the at least one first energy accumulator;
   at least one roller element means comprising a plurality of roller elements, wherein:
      a first portion of the plurality of roller elements is radially arranged between the at least one first energy accumulator and the at least one first wall, and operatively arranged to provide low friction support of the at least one first energy accumulator at the at least one first wall; and,
      a second portion of the plurality of roller elements is axially arranged between the at least one first energy accumulator and the at least one second wall, and operatively arranged to provide low friction support of the at least one first energy accumulator at the at least one second wall; and,
   a dish, wherein the dish is non-rotatably connected to the at least one first wall and radially arranged between the at least one first wall and the first portion of the plurality of roller elements, wherein the dish includes groove-shaped running surfaces for the plurality of roller elements, and wherein the plurality of roller elements comprise balls.

2. The hydrodynamic torque converter device recited in claim 1, wherein the roller element means further comprises a roller element carrier and the plurality of roller elements is received or supported by the roller element carrier.

3. The hydrodynamic torque converter device recited in claim 1, wherein the at least one first wall is disposed radially outside of the at least one first energy accumulator.

4. The hydrodynamic torque converter device recited in claim 1, wherein the torsion vibration damper comprises a rotation axis, and the at least one first wall is substantially circumferentially closed, with respect to a circumferential direction of the rotation axis.

5. The hydrodynamic torque converter device recited in claim 1 further comprising a first housing arranged to receive the at least one first energy accumulator therein, and wherein the at least one first wall is a component of the first housing.

6. The hydrodynamic torque converter device recited in claim 2, wherein the roller element carrier comprises a dish-shaped or curved portion, in which the at least one first energy accumulator is received.

7. The hydrodynamic torque converter device recited in claim 2, wherein the roller element carrier comprises a radial outside, and wherein the first portion of the plurality of roller elements is disposed at or on the radial outside of the roller element carrier.

8. The hydrodynamic torque converter device recited in claim 2 wherein the torsion vibration damper comprises a rotation axis, wherein the first portion of the plurality of roller elements is arranged in at least two rows which are axially offset from one another with respect to the rotation axis.

9. The hydrodynamic torque converter device recited in claim 5, wherein the first energy accumulator means comprises an input component and an output component, the input component and the output component being arranged such that a torque can be transferred from the input component, through the first energy accumulator means, to the output component, wherein the at least one first wall and the first housing are non-rotatably connected to the input component, or are integrally formed by the input component.

10. The hydrodynamic torque converter device recited in claim 1, wherein the torsion vibration damper further comprises a second energy accumulator means, the second energy accumulator means including at least one second energy accumulator.

11. The hydrodynamic torque converter device recited in claim 10 further comprising an intermediary component, wherein the first energy accumulator means is serially connected to the second energy accumulator means, wherein the intermediary component is arranged between the first energy accumulator means and the second energy accumulator means, such that a torque can be transferred from the first energy accumulator means, through the intermediary component, to the second energy accumulator means.

12. The hydrodynamic torque converter device recited in claim 11, wherein the turbine shell comprises an outer turbine dish, and the outer turbine dish is non-rotatably connected to the intermediary component.

13. The hydrodynamic torque converter device recited in claim 12, further comprising a first housing arranged to receive the at least one first energy accumulator therein, wherein the at least one first wall and the first housing are non-rotatably connected to the outer turbine dish.

14. The hydrodynamic torque converter device recited in claim 12, wherein the at least one first wall and the first housing are non-rotatably connected to the intermediary component, or are integrally formed with the intermediary component.

15. The hydrodynamic torque converter device recited in claim 12 further comprising a driver component, wherein the at least one first wall and the first housing are non-rotatably connected to, or integrally formed with, the driver component.

16. A torsion vibration damper comprising:
    a first energy accumulator means having at least one first energy accumulator;
    at least one first wall arranged to provide radial support of the at least one first energy accumulator;
    at least one second wall arranged to provide axial support of the at least one first energy accumulator;
    at least one roller element means comprising a plurality of roller elements, wherein:
        a first portion of the plurality of roller elements is radially arranged between the at least one first energy accumulator and the at least one first wall, and the first portion of the plurality of roller elements is arranged to provide low friction support for the at least one first energy accumulator at the at least one first wall; and,
        a second portion of the plurality of roller elements is axially arranged between the at least one first energy accumulator and the at least one second wall, and the second portion of the plurality of roller elements is arranged to provide low friction support for the at least one first energy accumulator at the at least one second wall; and
    a dish, wherein the dish is non-rotatably connected to the at least one first wall and radially arranged between the at least one first wall and the first portion of the plurality of roller elements, wherein the dish includes groove-shaped running surfaces for the plurality of roller elements, and wherein the plurality of roller elements comprise balls.

* * * * *